United States Patent [19]

Hamilton

[11] 4,159,093
[45] Jun. 26, 1979

[54] ADJUSTABLE SUPPORT FOR A HEADREST

[75] Inventor: W. Duane Hamilton, Middletown, R.I.

[73] Assignee: American Optical Corporation, Southbridge, Mass.

[21] Appl. No.: 910,053

[22] Filed: May 26, 1978

[51] Int. Cl.$^2$ .............................. A47F 5/00; A47H 1/10
[52] U.S. Cl. ................................... 248/284; 248/118; 297/409; 403/91; 403/350
[58] Field of Search ............... 248/118, 160, 282, 284, 248/276; 297/406–409; 403/91, 99, 350, DIG. 8

[56] References Cited

U.S. PATENT DOCUMENTS

| 827,267 | 7/1906 | Schmidt | 403/DIG. 8 |
|---|---|---|---|
| 1,088,690 | 3/1914 | Erwin | 248/276 |
| 1,572,215 | 2/1926 | May | 248/284 X |
| 1,817,755 | 8/1931 | May | 297/409 |
| 2,348,961 | 5/1944 | Cowper | 248/284 X |
| 2,586,417 | 2/1952 | Cole | 248/284 X |
| 3,041,034 | 6/1962 | Wilkinson | 248/284 |
| 3,047,688 | 7/1962 | Small | 248/282 X |
| 3,240,516 | 3/1966 | Barish et al. | 248/284 X |
| 3,761,128 | 9/1973 | Schenk et al. | 297/408 |
| 3,910,538 | 10/1975 | Baitella | 248/276 X |

FOREIGN PATENT DOCUMENTS 521816  3/1921  France .................................. 248/284

*Primary Examiner*—Lawrence J. Staab
*Attorney, Agent, or Firm*—Jeremiah J. Duggan; Alan H. Spencer

[57] ABSTRACT

A support for a headrest characterized by an articulable arm having a locking system operable single-handedly for locking the arm at selected positions of adjustment and releasing for readjustment.

4 Claims, 3 Drawing Figures

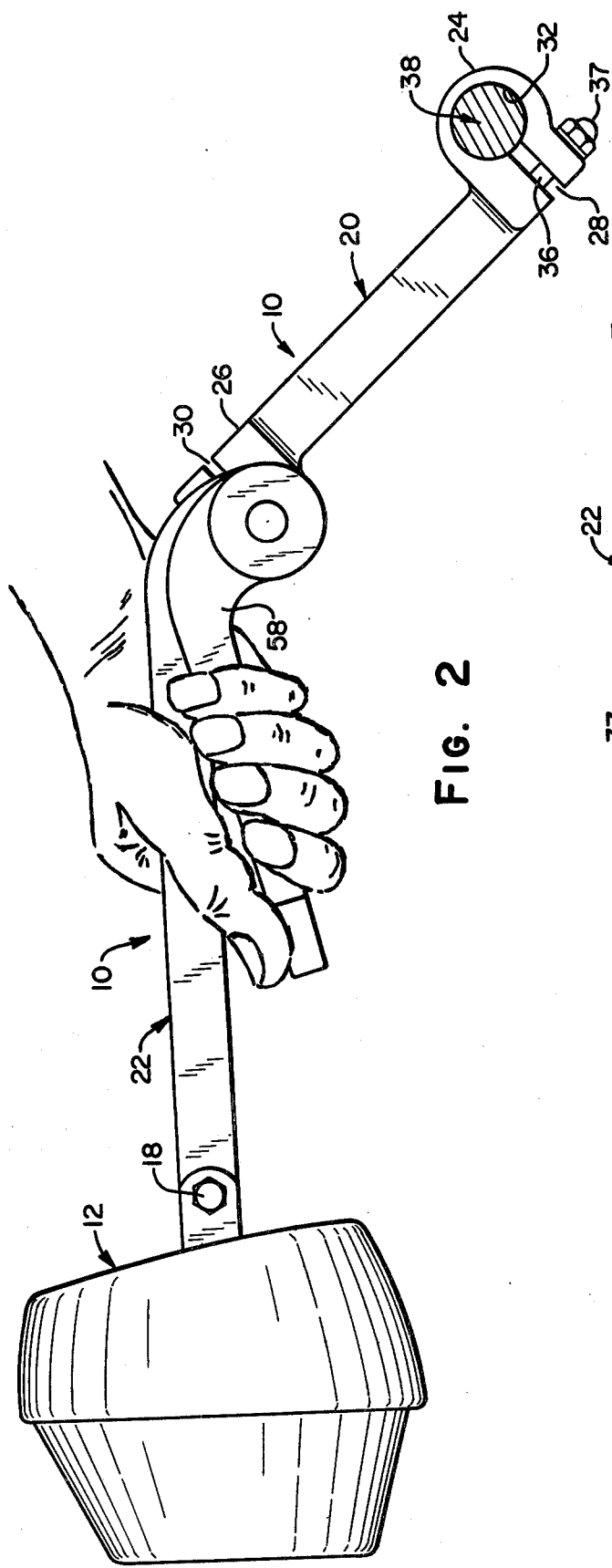
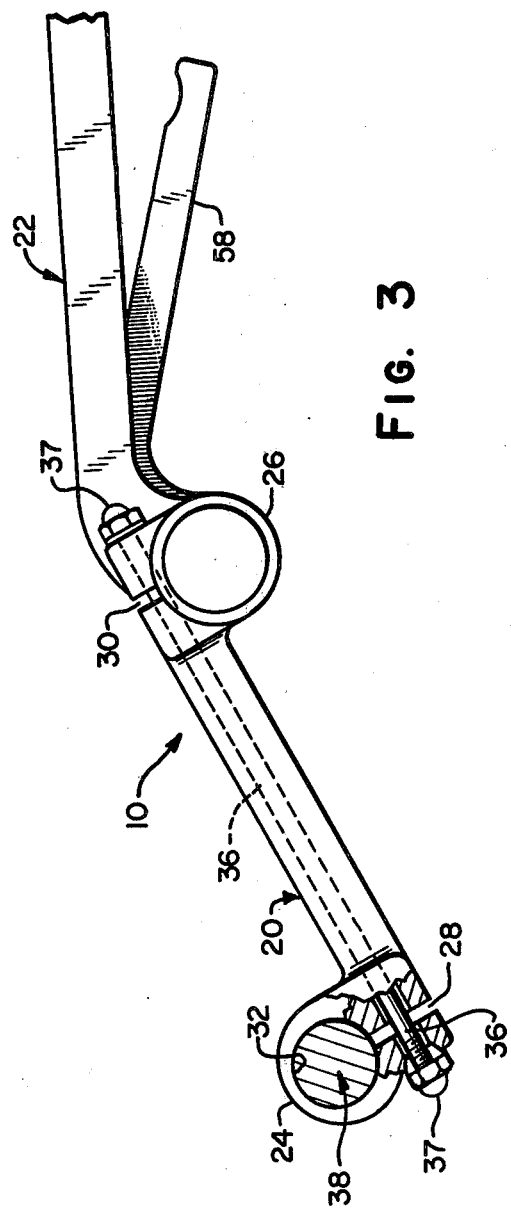

ADJUSTABLE SUPPORT FOR A HEADREST

BACKGROUND OF THE INVENTION

1. Field of the Invention

This invention relates to an articulable supporting arm for headrests and other devices such as lamps, mirrors and instruments or the like and has particular reference to a unique system for locking the arm at various desired positions of adjustment and releasing for readjustment.

2. Discussion of the Prior Art

Supporting arms for headrests of optometrist's, dentist's or physician's examining chairs and the like are traditionally articulated to facilitate comfortable positioning of the headrest according to the patient's stature and/or disposition of the head desired by the practitioner.

The usual articulation includes linkage between the headrest and chair which requires locking at two or more points when the arm is finally set for use. For one hand operation, this has heretofore required the investment of relatively complex and costly mechanisms including parallelogram-fashioned linkage with brake shoes and drums as in U.S. Pat. No. 3,041,034, for example, or releasably interlocking ratcheting mechanisms as in U.S. Pat. No. 3,761,128.

Alternatives to such mechanical complexity include the provision of a separate tightening screw at each articulation of the support arm, e.g. as in U.S. Pat. No. 3,477,761, which requires the use of two hands for manipulation of the arm. This seriously inhibits the practitioner.

Accordingly, it is, an object of the present invention to provide a support for a headrest or other device which is operable single-handedly and is of uniquely simple and inexpensive construction.

Another object is to provide a novel readily releasable locking system for an articulable headrest supporting arm wherewith a plurality of joints may be simultaneously positively locked and released with one hand.

Still another object is to afford positive locking in such as the aforesaid structure with thumb pressure and ready release by closing of fingers of the same hand, both operations being performable from a single position of the hand upon the headrest supporting arm.

SUMMARY OF THE INVENTION

The aforesaid objects and their corollaries are accomplished by the provision of an articulable arm adapted to extend between a headrest or other device and the back of a chair or other main supporting member. The arm is characterized by including a pair of links, one having a partially slotted pivot hub at each of its opposite ends. A tension bolt connects the slotted portions of the two hubs together. One of the hubs of the latter link pivotally receives one end of other link and the opposite hub is pivotally connected to the aforesaid main supporting member.

The pivotal connection which joins the links of the support arm is provided with a lever-operated eccentric which when moved in one direction, e.g. with the thumb, clamps the links of the arm securely together and simultaneously clamps the arm to the main supporting member. This system, as it will become more readily apparent hereinafter, operates on the principle of using a single tension bolt to transfer clamping motion from an expanded clamping surface to close an alternate clamping surface. Movement of the clamping lever in an opposite direction from the same hand position, e.g. by closing of the fingers, releases the links for readjustment of the support arm.

Details of the invention will become more readily apparent from the following description when taken in conjunction with the accompanying drawings.

IN THE DRAWINGS

FIG. 2 is an elevational view of one side of the headrest support arm illustrated in FIG. 1; and FIG. 3 is a fragmentary view of the opposite side of the support arm.

DESCRIPTION OF THE PREFERRED EMBODIMENTS OF THE INVENTION

Figure 1:
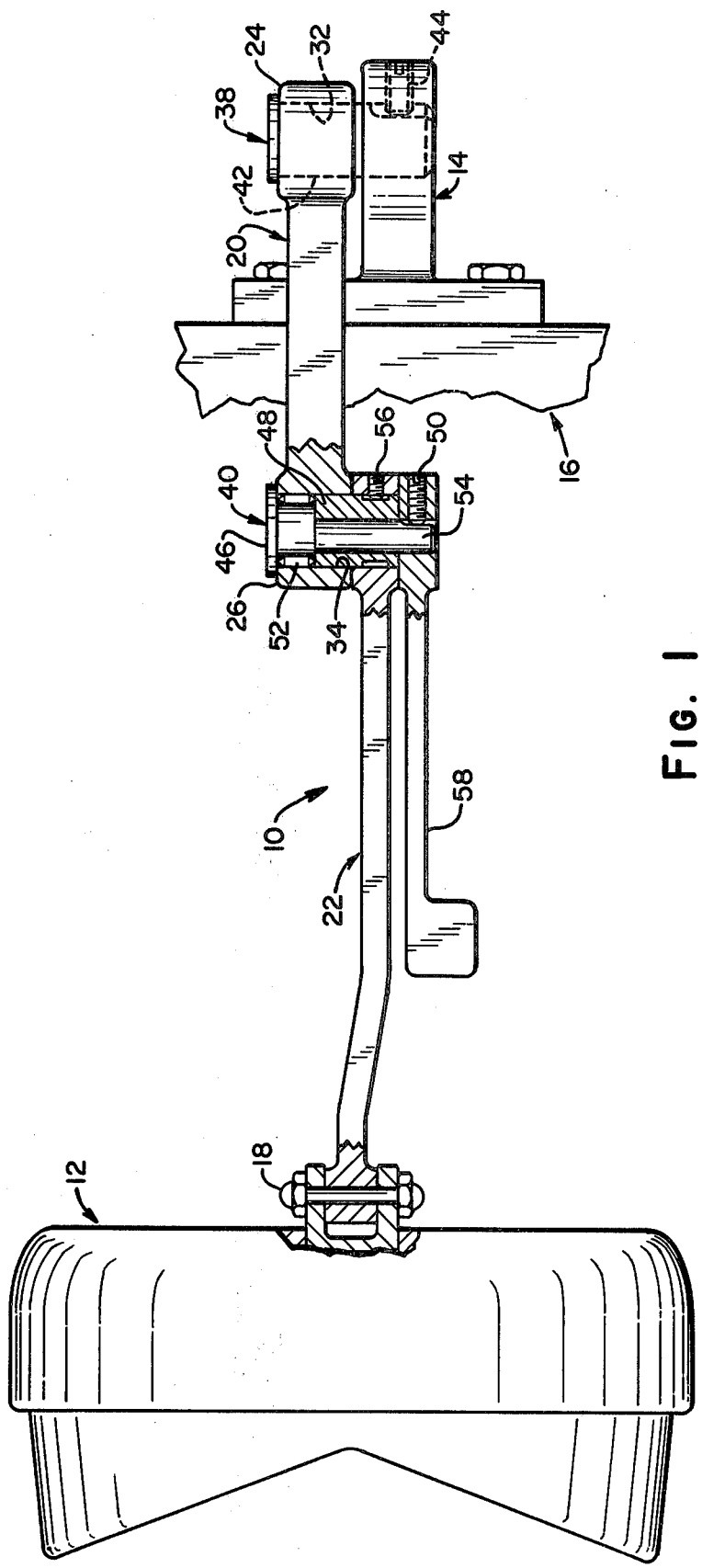
FIG. 1 is a partially cross-sectioned plan view of a preferred embodiment of the invention.

Referring to the drawings, support arm 10 carrying headrest 12 is illustrated as extending from bracket 14 of the back 16 of an optometrist's, dentist's, physician's or other practitioner's chair. Headrest 12 is frictionally pivotally connected to arm 10 for independent adjustment about the axis of connecting bolt 18.

It is to be understood that in place of headrest 12, arm 10 may be used to support a lamp, examining instrument, instrument tray or other apparatuses. Also, as the main support for arm 10, bracket 14 or other such means may be affixed to a wall, instrument stand, table or other means suitable to particular adaptations of the invention.

Arm 10, being articulable, comprises pivotally connected proximal and distal links 20 and 22.

Proximal link 20 is provided with hubs 24 and 26 respectively having radial slots 28 and 30 which permit expanding or closing of bores 32 and 34 extending therethrough. Tension bolt 36 directed longitudinally through link 20 and across each of slots 28 and 30 affords means for control of limited opening or closing of bores 32 and 34 as will be explained in detail shortly.

Pivot 38 extending through bore 32 of hub 24 and fixed to bracket 14 provides the connection of arm 10 to chair 16 while pivot 40 extending through bore 34 of hub 26 and link 22 renders arm 10 intermediately articulable.

Pivot 38 is preferably in a form of a post 42 closely fitted in bore 32 and fastened to bracket 14 with locking screw 44 (FIG. 1).

Pivot 40 comprises post 46 fitted within sleeve 48 which, in turn, is fixed to link 22 of arm 10 by set screw 50. Post 46 is journaled concentrically in bore 34, e.g. with needle bearings 52 and is provided with eccentric shank 54.

Fixed to shank 54 with set screw 56 is lever 58 wherewith, in one of its positions, links 20 and 22 of arm 10 are free to rotate on sleeve 48 and bearings 52. Tension bolt 36 is tightened with adjusting nuts 37 until clamping surfaces of hubs 24 and 26 have a snug fit upon their respective pivots.

Movement of lever 58 counterclockwise as viewed in FIG. 2, e.g. with thumb pressure, forces sleeve 48 and bearings 52 tightly against bore 34 by causing relative axial misalignment thereof. This action, in clamping links 20 and 22 fixedly together, effects an expansion of slotted bore 34 in hub 26 which, in turn, applies tension to bolt 36 and correspondingly closes bore 32 in hub 24 to simultaneously clamp hub 24 fixedly to post 42. Arm 10 being so locked, e.g. in a desired position of adjustment, may be readily released by clockwise rotation (FIG. 2) of lever 56. This may be accomplished by closing the fingers illustrated in FIG. 2.

With a single positioning of one hand as depicted in FIG. 2, unlocking for adjustment of arm 10 and locking may be accomplished while the practioner's other hand is free for other purposes.

Those skilled in the art will readily appreciate that there are various other forms and adaptations of the invention which may be made to suit particular requirements. The foregoing illustrations are not to be interpreted as restrictive of the invention beyond that necessitated by the following claims.

I claim:

1. A support arm structure comprising:

a pair of links, one of said links having a pivot hub at each of its opposite ends, said hubs being partially radially slotted and a first of said hubs being pivotally connected to a main supporting means for said arm and the second hub being pivotally fitted to one end of the other of said links for permitting intermediate articulation of said arm;

lever operable means within said second hub for selectively releasably clamping said links against relative movement, said lever operable means including an eccentric acting to expand said second hub for said clamping of said links; and tensioning means coacting with said lever operable means for simultaneously releasably clamping said first hub to said main supporting means.

2. A support arm structure according to claim 1 including a lever fixed to said eccentric, said lever being in approximate juxtaposition with one of said links.

3. A support arm structure according to claim 1 wherein said tensioning means includes a rod extending along said one link and across said radial slots of said hubs wherewith said expansion of said second hub is translated to tension on said rod tending to close said first hub for clamping to said main support means.

4. A support arm structure according to claim 3 wherein the effective length of said rod is adjustable according to freedom of movement desired of said arm when said first and second hubs of said one link are respectively normally unclosed and unexpanded.

* * * * *